United States Patent [19]

Kent

[11] Patent Number: 4,601,055
[45] Date of Patent: Jul. 15, 1986

[54] IMAGE PROCESSOR

[75] Inventor: Ernest W. Kent, Gaithersburg, Md.

[73] Assignee: The United States of America as represented by the Secretary of Commerce, Washington, D.C.

[21] Appl. No.: 598,602

[22] Filed: Apr. 10, 1984

[51] Int. Cl.⁴ .......................... G06K 9/56; G06K 9/36; G06F 15/66
[52] U.S. Cl. ..................... 382/49; 364/900; 364/514; 358/166; 382/41
[58] Field of Search ... 364/200 MS File, 900 MS File, 364/718, 724, 728, 514, 517; 382/41, 42, 49, 48; 358/166, 167

[56] References Cited

U.S. PATENT DOCUMENTS

| | | | |
|---|---|---|---|
| 4,167,728 | 9/1979 | Sternberg | 382/49 |
| 4,322,716 | 3/1982 | Sternberg | 364/900 X |
| 4,330,833 | 5/1982 | Pratt et al. | 382/42 |
| 4,369,430 | 1/1983 | Sternberg | 382/27 |
| 4,464,789 | 8/1984 | Sternberg | 382/48 |
| 4,475,161 | 10/1984 | Stock | 364/521 |
| 4,541,114 | 9/1985 | Rutebar et al. | 382/8 |

Primary Examiner—James D. Thomas
Assistant Examiner—William G. Niessen
Attorney, Agent, or Firm—Eugene J. Pawlikowski; Alvin J. Englert; Ross F. Hunt, Jr.

[57] ABSTRACT

An iconic-to-iconic low-level image processor is provided which comprises a plurality of identical sequential intermediate stages located between an input stage adapted to be connected to image sources such as analog or digital television cameras, ranging devices and conformal mapping arrays and an output stage adapted to be connected, e.g. to monitors, robot vision systems, iconic symbolic mapping devices and image processing computers. The intermediate stages are provided with forward pathway connections which afford sequential image processing as well as retrograde (feedback) pathway connections between adjacent stages in reverse sequence and within stage, recursive pathway connections for each stage. The stages each include neighborhood operators and image buffers and a number of operations are supported including neighborhood operations on images within each stage and between-stage operations on each pixel such as threshold, boolean and arithmetic operations, function mappings and the like.

15 Claims, 10 Drawing Figures

TO FIG. 9B

IMAGE PROCESSOR

FIELD OF THE INVENTION

The present invention generally relates to image processing and more particularly to a front end processor for low-level iconic-to-iconic image processing.

BACKGROUND OF THE INVENTION

An image to be processed may be presented in a variety of ways. The most "natural" of these is to represent one or more intrinsic properties of the image (such as surface brightness, color, or range) in an ordered array or map whose cells correspond to the spatial locations of the image points. Such a map is often called an "iconic" image. An example of an iconic image is the representation of images on a television screen. An alternative image representation, often called a "symbolic" image, results when features of the image are represented by symbols which are stored in linked list or similar data structure. A chain-coded representation of edges is an example of a symbolic representation.

Since an iconic image is spatially indexed, the whole image, or whole subregions of the image, must usually be processed during each operation, and massively parallel processing is required for real-time operation. Serial computer image-processing techniques typically attempt to reduce the image to a symbolic representation as rapidly as possible to enhance the efficiency of serial processing. While this data compression brings many image processing operations within the capabilities of ordinary serial computers, it makes many other operations more difficult, such as subtracting one image from another.

Parallel processors are ideally suited to the early stages of image processing, where spatial and temporal features have not yet been discovered. They lend themselves to processing strategies based on multi-resolution (pyramid) representations, and facilitate relaxation techniques for which a spatially ordered representation is most natural and efficient. Unfortunately, true multistage parallel processing is prohibitively expensive for images of useful size.

As will appear, the processor of the invention is intended to perform transformations on images to extract features similar to those in the primal sketch disclosed in D. Marr, "Early Processing of Visual Information", Phil. Trans. Royal Society, B.275, 1976. Prior art processors of interest include the PUMPS system described in F. A. Briggs, K. S. Fu, K. Hwang, and B. W. Wah, "PUMPS Architecture for Pattern Analysis and Image Database Management", IEEE Trans. Computers C-31 10, Oct. 1982, pp. 969-983. The PUMPS system is an example of a multi-user system in which various task processing units are allocated from a pool. Each processor is specialized for a particular purpose, and images are transformed by passing them through a sequence of different processors.

Other prior art systems have components that perform some of the functions of the processor of the invention. However, these systems usually operate on a single image at a time. For example, the PICAP II system, disclosed in D. Antonsson, B. Gudmundsson, T. Hedblom, B. Kruse, A. Linge, P. Lord, and T. Ohlsson, "PICAP—A System Approach to Image Processing", IEEE Trans. Computers, C-31 10, Oct. 1982, pp. 997-1000, has a filter processor, FLIP, that performs some of the operations of a stage in the processor of the invention. The system also has other processors that are specialized for operations such as image segmentation. Further, the FLIP system disclosed in X. Luetjen, X. Gemmar, and X. Ischem, "FLIP: A Flexible Multi Processor System for Image Processing", Proc. Fifth International Conference on Pattern Recognition, Miami, Fla., 1980 is similar to the processor of the invention in that, in common with the latter, it has a number of identical processors, but the FLIP system usually uses these processors in parallel on sub-images of the same image instead of on successive versions of complete images. The FLIP system also allows greater flexibility in the connections between its processors. As will be explained, in the system of the invention processors are normally connected only to their immediate predecessors and successors, although "wildcard" busses which are provided allow selective but limited connections between arbitrary stages. The FLIP system, on the other hand, provides connections between all processors, allowing the processors to be arranged to suit each particular task.

Other special processors for image processing include the massively parallel processor, the MPP system disclosed in J. L. Potter, "Image Processing on the Massively Parallel Processor", IEEE Computer Magazine 16, Jan. 1983, pp. 62-67, and the ZMOB system, disclosed in T. Kushner, A. Y. Wu and A. Rosenfeld, "Imaging Processing on ZMOB", IEEE Trans. Computers, C-31 10, Oct. 1982, pp 943-951, which is a more general parallel processor but which has been studied extensively with regard to its abilities to perform image processing tasks. The MPP system has 16K processors, and is a true parallel processor. Experience with the processor is limited, but a major difficulty appears to be the problem of transferring the data to each individual processor, and getting the results out of the machine. The MPP system does not have a true neighborhood operator, although each processor can be connected to four of its neighbors and use the pixel values there to compute the result. It is not clear that the MPP processor has any advantage over pipelined systems, because the images are usually obtained from an imaging system or storage medium in a stream, and sent to successive processors in the same fashion.

The ZMOB system consists of 256 processors connected by a ring-shaped high speed communications system. The communications link operates fast enough to make each processor appear to be connected to all others. Each processsor is a general-purpose eight-bit microcomputer, with 64K bytes of memory. Thus, many different computations can be performed at the same time, either on the same or different data. For image-processing applications, images are usually broken into parts, each of which is sent to a different processor. Many operations require interaction between the parts, especially when neighborhood operations are performed. This gives rise to the need for communications between processors. Given that the communications link is much faster than the cycle time of the processors, there is very little overhead involved. However, upgrading the processors might cause data transmissions to become significant.

Other prior art of possible interest is the digital image processing apparatus disclosed in U.S. Pat. No. 4,330,833 (Pratt et al).

SUMMARY OF THE INVENTION

In accordance with the invention, an iconic-to-iconic image processor is provided which affords a number of advantages over prior art image processors. The image processor of the invention can acquire images from a variety of sources, such as analog or digital television cameras, ranging devices and conformal mapping arrays. The processor can process sequences of images in real time, through a serial pipeline of operations, under external control. The output of the image processor of the invention can be presented to a variety of devices, such as monitors, robot vision systems, iconic to symbolic mapping devices and image processing computers.

Generally speaking, the image processor of the invention is a front end processor or preprocessor for low-level iconic-to-iconic image processing and, as noted above, is intended to perform transformations on images to extract features similar to those disclosed in the Marr reference referred to above. These features make intensity changes and local geometric relations explicit in images, while maintaining the spatial representation. It is noted that the processor of the invention differs in this regard from many processors designed for image processing in that the latter are usually designed to perform both local and global image-processing tasks, often in an interactive setting. The processor of the invention generally comprises a plurality of identical intermediate sequential processing stages which are sandwiched between input and output stages and which are adapted to perform a number of point and neighborhood operations. In addition to the forward flow of images between the successive stages in the pipeline as referred to above, further paths between and within the stages are provided which permit recursive operations within a single stage as well as feedback of the results of operations from one stage to the preceding stage. This architecture facilitates a number of relaxation operations, interactions of images over time and other functions of interest. Numerous operations are supported, including, inter alia, arithmetic and boolean neighborhood operations on images within each stage, and between-stage operations on each pixel such as thresholding, boolean and arithmetic operations, functional mappings, and a variety of functions for combining with pixel data converging through the multiple image paths provided.

The processor of the invention can also be used to implement several alternate processing modes. Some of these operate within each stage so as to, for example, control edge effects or implement operations specific to regions of interest defined by the host device. Other processing modes operate between stages so as to, for example, support variable resolution pyramids as explained below.

Briefly comparing the invention with some of the prior art processors discussed above, in contrast to the PUMPS system in which each processor is specialized for a particular purpose and images are transformed by passage thereof through a plurality of sequentially arranged processors serving different purposes, the processor of the invention utilizes a sequence of identical stages each having the power to perform several different operations on the images. The programmer specifies the task each stage is to perform to ensure that the overall goal is attained. In general, the processor of the invention is dedicated to a single user, although pipelines are readily constructed from a set of identical components, thereby permitting access by each one of a number of users to a specially tailored processing system. A set of such processors could even be added to the pool of available processors provided by the PUMPS system and used as a resource in the same way as the other processors.

In contrast to the FLIP system discussed above, the processor of the invention generally operates on successive versions of complete images rather than using the processors in parallel on subimages of the image as is usually done in the FLIP system. Further, the intermediate stages processors are normally connected only to their immediate predecessors and successors, although, as explained below, so-called "wildcard" busses are provided which permit selective but limited connections between arbitrary stages.

Regarding the MPP and ZMOB systems referred to previously, passible disadvantages of the MPP system were discussed above, and, in general, it is not clear that such a system has any advantages over a pipelined system such as that of the invention because images are usually obtained from an imaging system or storage medium in a stream and sent to successive processors in the same manner. Possible shortcomings of the ZMOB system were also discussed previously, and although it is clear that the processor of the invention is less powerful that the ZMOB system, it is equally clear that the processor of the invention is better suited to its role of low-level image processing.

As discussed above, an important feature of the processor of the invention is the provision of forward, recursive and backward paths to allow the image data to participate in temporal as well as spatial neighborhood operations. The backward pathway allows expectations or image models to be inserted into the system by the host machine, and to participate in processing in the same way as images acquired from the input stage device. The region-of-interest operator, which was mentioned above and is described in more detail below, is also an important feature in that it enables the results of feature-extraction processes to guide further image analysis. The processing system of the invention also provides a multi-resolution capability which enables global events to be made local, important feature in a machine having only local operators. These features, and other important features and advantages of invention, are best understood from the more detailed description found hereinbelow of the overall processing system, beginning with basic considerations and including specific processing examples.

DESCRIPTION OF THE PREFERRED EMBODIMENTS

Figure 7:
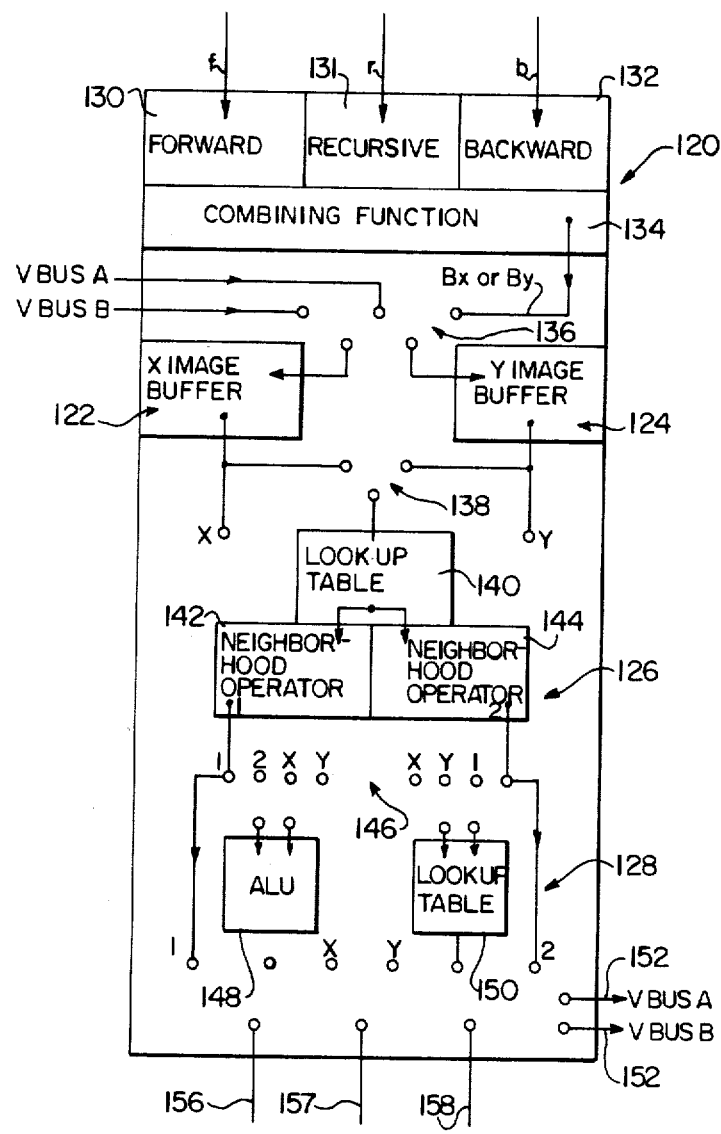
FIG. 7 is a schematic representation of one of the immediate image processing stages used in explaining the operation of the system.
Figure 8:
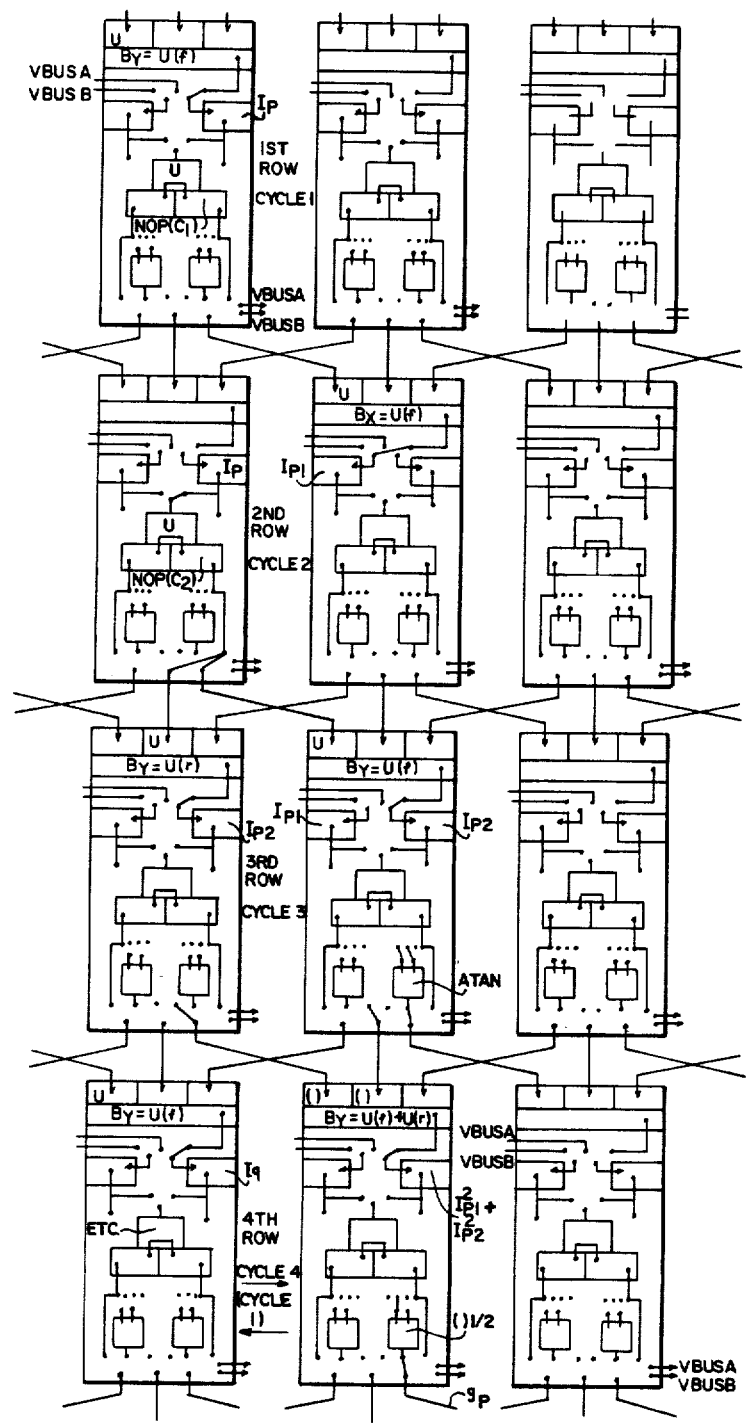
FIGS. 8, 9A and 9B illustrate two programming examples, using, as a basic unit, the schematic representation of FIG. 7.
Figure 9A:
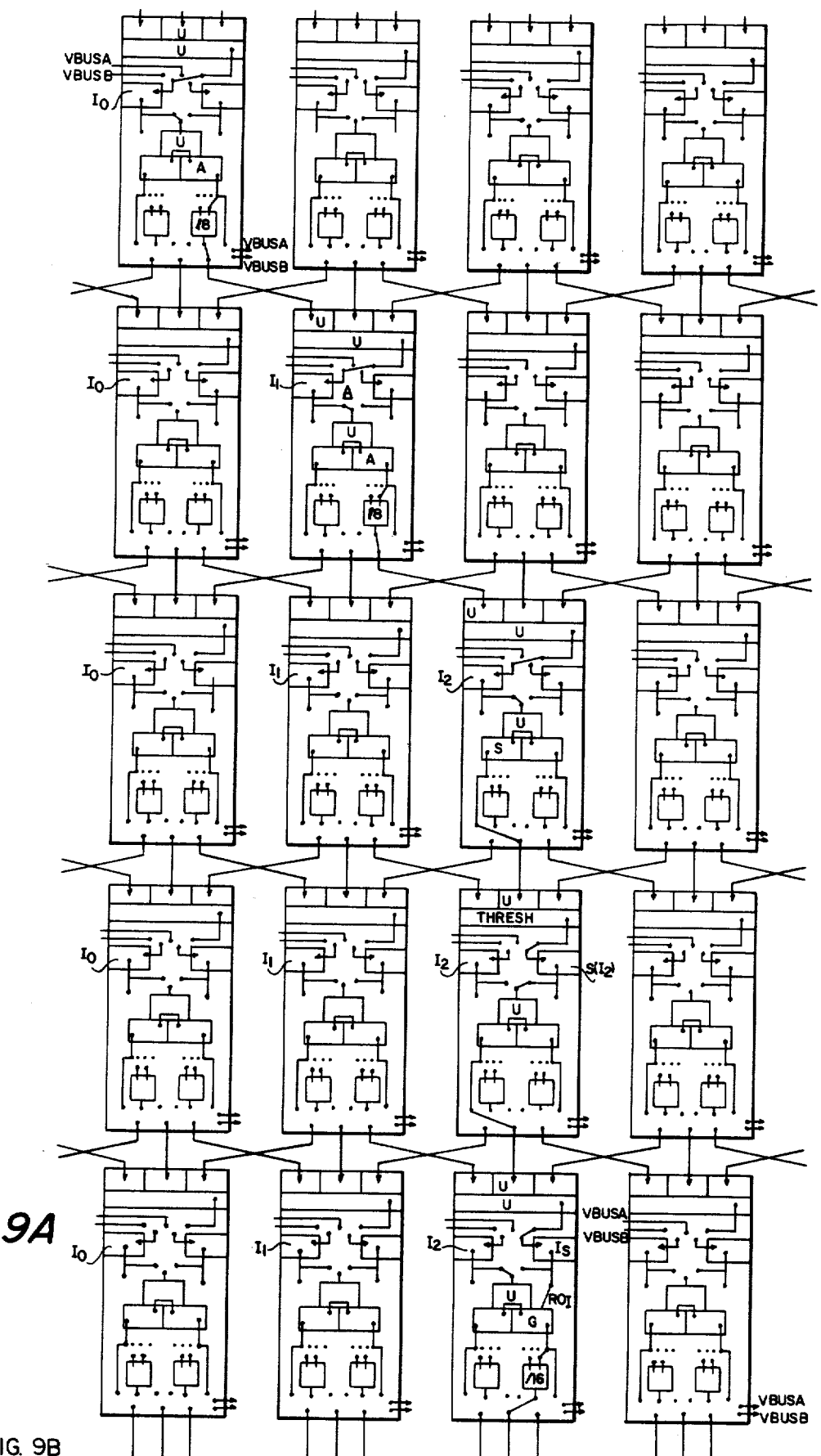
Figure 9B:
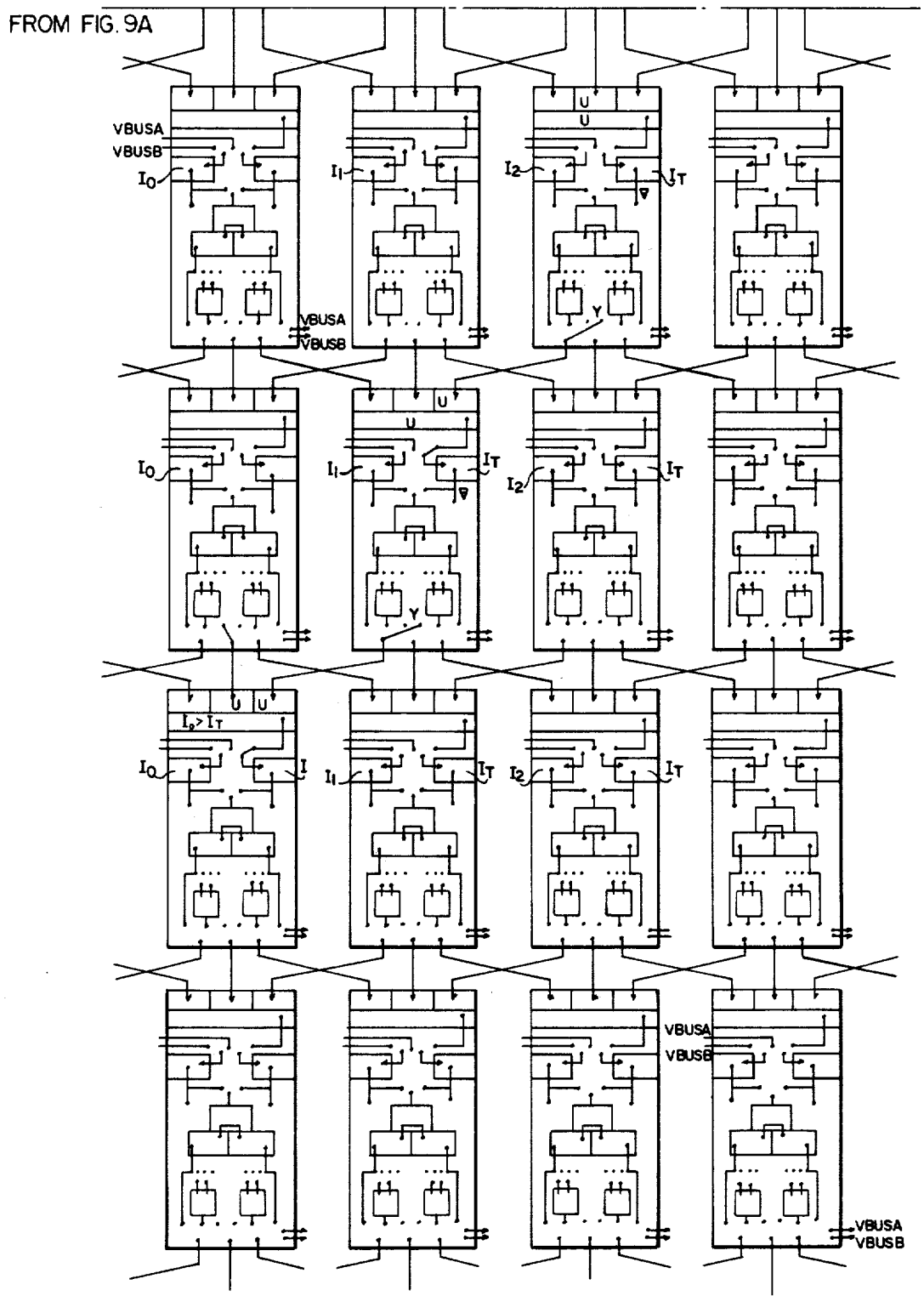

The image processor of the invention will first be described in general terms in connection with FIGS. 1 to 5 to provide an overall understanding of the invention, and then described further in connection with a more detailed embodiment (FIG. 6), and a schematic representation (FIG. 7) which is used as a base unit in explaining the operation of the processor of the invention in relation to two specific examples (FIGS. 8 and FIG. 9).

Figure 1:
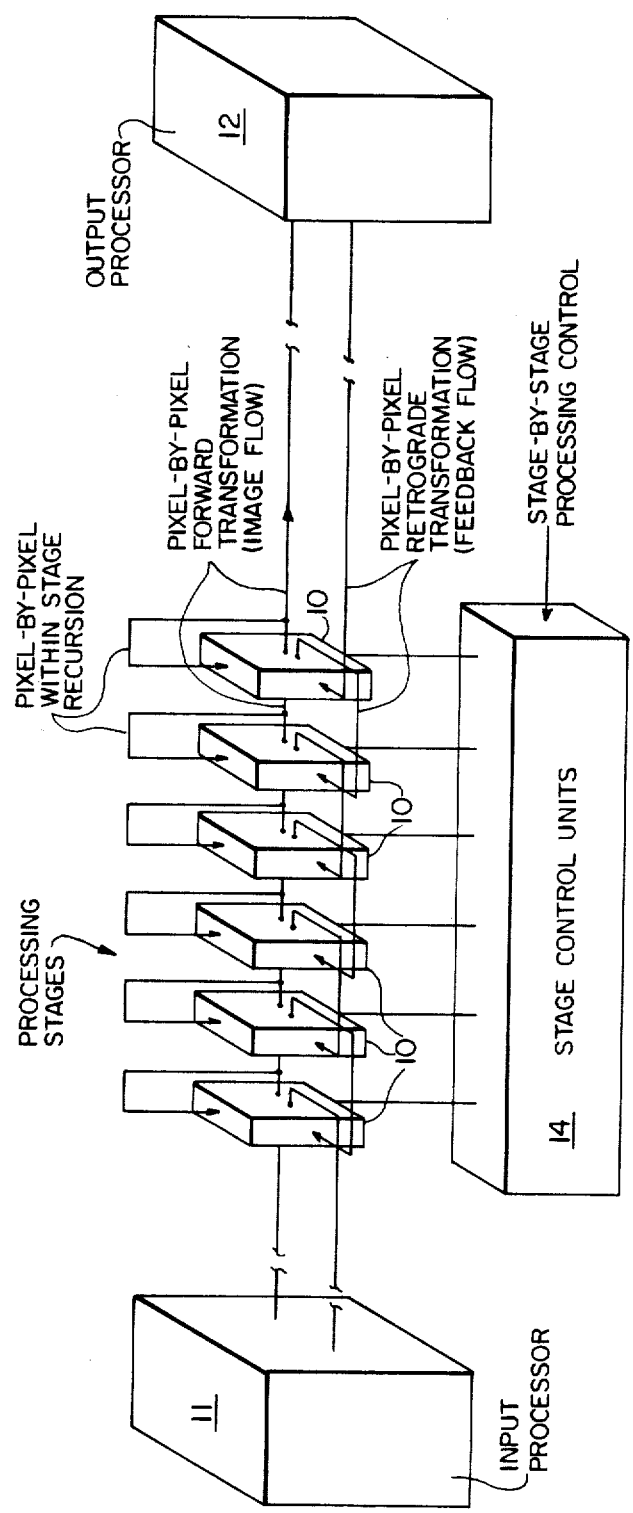
FIG. 1 is a block diagram of the basic components of the image processor of the invention.

The basic components of the image processor of the invention comprise, as illustrated in FIG. 1, a sequence of identical processors 10 sandwiched between a specialized input processor 11 and a specialized output processor 12. The input processor 11 accepts an image from any device that encodes two-dimensional images, such as a gray-scale camera, a range sensor, or other special hardware, and thus input processor 11 serves as a buffer between the rest of the processors and the outside world. Each successive processing stage 10 receives image data in an identical format, operates on the data, and passes the data on to the next stage for further processing. This sequence is repeated every television field-time. When an image emerges at the far end of the sequence, it is processed by the specialized output processor 12, and presented thereby to some other device (not shown), such as a robot vision system or a serial computer.

The intermediate processors 10 between the input and output stages 11 and 12 are all identical and interchangeable, but can each perform different operations on the image sequences that are encountered thereby. Usually, each processor 10 receives three input images and transmits three output images. As illustrated in FIG. 1, the input images arrive (i) from the processing stage immediately behind, (ii) from the processing stage immediately ahead, and (iii) from a result of the preceding operation just performed by the processor itself. Similarly, the results of its processing of its current image are transmitted to the next processing stage in the sequence, to the immediately-preceeding processing stage, and recursively back into the processor itself. These three outputs are not necessarily identical, and each may furnish part or all of the inputs to the other processors for the subsequent steps in processing. The three inputs may be weighed and combined in each processor, in any fashion, before they are processed. In addition to the usual input and output paths, two "wildcard" paths, described below, are provided for both input and output. These paths are common to all stages, so that only one stage can write to a particular wildcard path at a time. The wildcard paths allow image frames to be moved arbitrarily between stages, instead of having to step through from stage to stage. There are no restrictions on the number of destinations for a frame output to a wildcard path.

There are two main kinds of processing that may be carried out in each processing stage. The first involves simple pointwise arithmetic or boolean operations, on a pixel-by-pixel basis. The second is a neighborhood operation, which is performed in a pipelined fashion. It should be noted that the image processor of this invention contains two kinds of pipelines. The first is a pipeline of images that proceed from one processor to the next processor in sequence, while the second is a pipeline of neighborhoods within each processor 10.

There are number of reasons for requiring the three input and output paths from each processor. It is clear that the forward path allows a chain of operations to be performed, giving rise in real time to a transformed image (with a constant delay). Similarly, the recursive path allows a pipeline of arbitrary length to be simulated by each stage, and also facilitates the use of algorithms that perform many iterations before converging to a desired result (e.g., relaxation algorithms, or a simulation of large neighborhood operators by successive applications of smaller neighborhood operators). The path to the preceding processor allows operations using temporal as well as spatial neighborhoods. This path also allows information inserted at the output stage by the processes of the host machine to participate in the processing directly. This, for example, allows expectations or image models to be used to guide the processing at all levels, on a pixel-by-pixel basis.

As discussed above, and illustrated in FIG. 1, the image processor of this invention is composed of a variable number of identical, modular, image-processing stages 10. Every stage contains two field buffers (not shown in FIG. 1), each of which holds a processed version of the image from a single field of data. During each field time, each stage 10 operates on one member of a set of consecutive image fields. The stages contain fast special-purpose logic that processes the contents of the buffers and carries out inter-stage interactions in a single field-time (16.67 msec.) Each stage has an associated stage-control unit, generally denoted 14, that can redefine the process to be performed by the stage and change its parameters during the interfield interval. As was also discussed above, the stages 10 are connected by three distinct data paths which are shown in FIG. 1 and are discussed in more detail below.

The main processing tool of the present system is a neighborhood operator. The neighborhood operator may comprise either an arithmetic convolution operator or a set of arbitrary boolean operators. Additional operations are also possible as is discussed in more detail below. The neighborhood operations (either arithmetic or boolean) are performed on a neighborhood of each pixel in a stage buffer. Two such operations may be performed independently, in a single field-time, on the neighborhood of every pixel in the field. The image resulting from applying one of these neighborhood operators is carried forward into the subsequent stage (perhaps after undergoing other associated transformations). Similarly processing occurs in all stages simultaneously, so that the system forms an image pipeline into which new images are accepted at field rate. The image-flow processing follows the path indicated in FIG. 1 as "pixel-by-pixel forward transformation". At every processing stage, different processes may be applied to the image. Interactions between stages, which are set forth in more detail below, extend the processing to the "temporal neighborhood" of the pixel, permitting time-domain operations on the scene. These are useful, for example, in the analysis of motion.

A second "backward" data flow path is supported by each stage 10 backward " addition to the forward path. This path, indicated in FIG. 1 as "pixel-by-pixel retrograde transformation (feedback flow)", brings the output of one of the neighborhood operators of each stage back for combination with the image currently entering the preceding stage. The source of the data for this second, "retrograde" pathway may be the same as for the forward transformation, or may be the second neighborhood operator applied to each pixel neighborhood at the same time that the forward transformation operator is applied. Thus, the retrograde transformation may be independent of the forward transformation, or be identical with it. The results of the retrograde operation from one stage are carried into the preceding stage, permitting interaction forward in time, i.e., interaction with subsequent images. In this regard, it will be understood that the forward direction with respect to the pipeline stages corresponds to earlier images. This "retrograde" path thus permits feedback loops to be formed in the image flow processing.

Neighborhood operators can be used for a wide variety of image-processing tasks (e.g. averaging and noise reduction operations, edge, line, and point labeling operators, region growing, region shrinking, (non-) minima, and (non-) maxima). Some of these functions permit or require repetitive recursive operations. In other words, these functions require that the image resulting from one application of the operator be the input for a subsequent application of the same operator. This implies that the field buffer of a stage must be able to be loaded from the output of its own forward or backward transformation operators. The alternative would be to accomplish recursive operations by cascading the image through multiple identical operations in seqential stages, which could require an arbitrary number of stages. In FIG. 1, the recursive path provided by the image processor of this invention is labeled "pixel-by-pixel within stage recursion" and is shown as originating from the forward pathway. However, this recursive path may optionally arise from the backward pathway. In this regard, it is noted that two independent neighborhood operations are performed simultaneously, and that either may be chosen for the recursive path.

Figure 2:
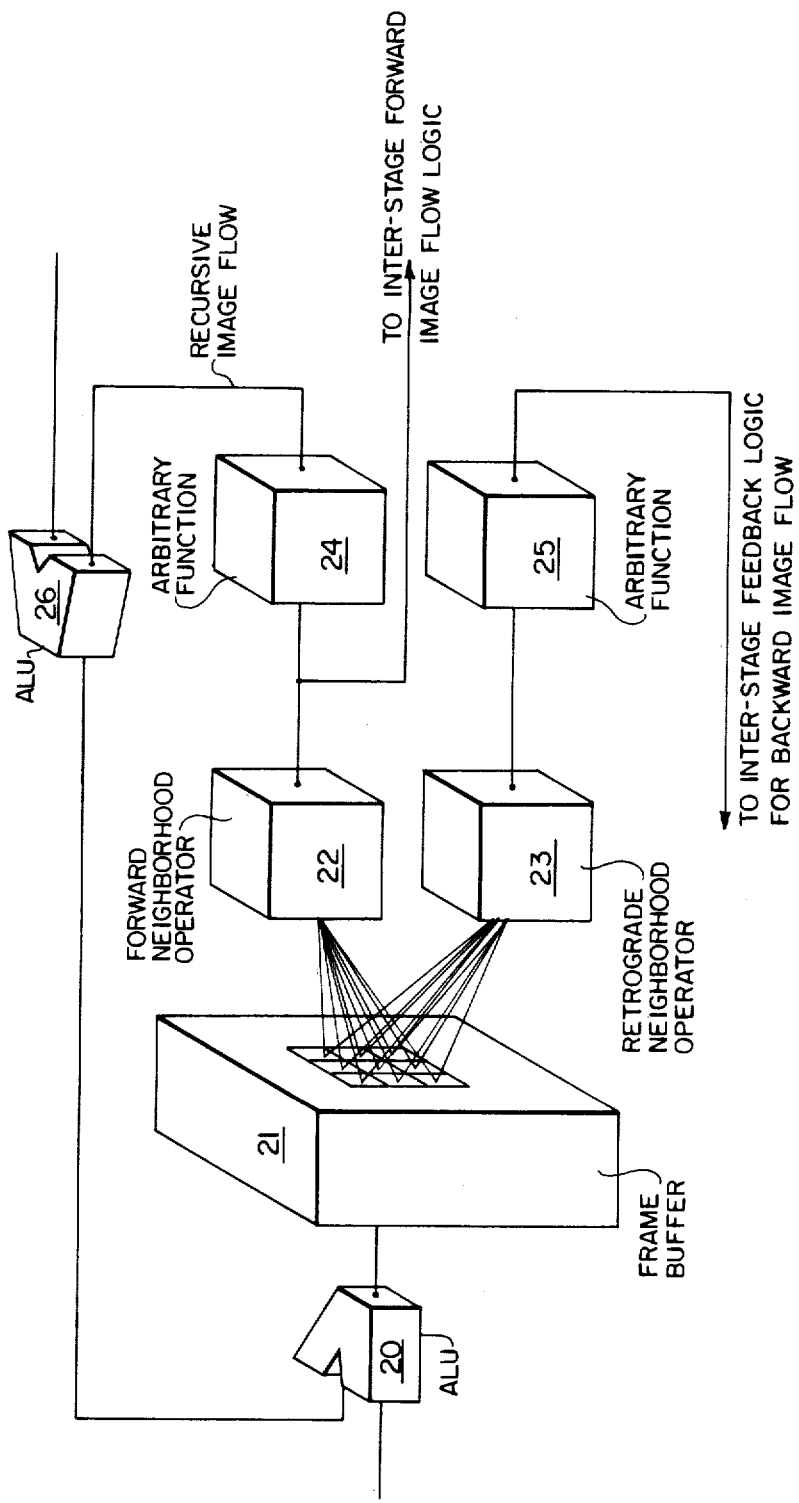
FIG. 2 is a schematic block diagram used in explanation of the function and operation of the paths between stages and within the simple stage.

Referring to FIG. 2, it is noted that the data actually stored in each stage are generated by logic that operates on, and performs various combinations of, the inputs from all three pathways. Feedback values and recursion values may be combined with the ascending image value in a proportion, summed or differenced with it (with or without constant offsets), or combined by any boolean operation. A schematic representation of the relationships between the forward and retrograde transformation operators and the spatial neighborhood of a single pixel is illustrated in FIG. 2. In this and the other figures in the drawings, the recursive pathway is shown originating from the forward transform unless otherwise specfied, but, as stated above, origin from the retrograde transform is an option in all cases. As illustrated in FIG. 2, data from an Arithmetic Logic Unit (ALU) 20 is received by a frame buffer 21 associated with a forward neighborhood operator 22 and retrograde neighborhood operator 23. Arbitrary functions 24 and 25 are also indicated which are employed in producing the recursive image flow and the backward image flow, respectively, as illustrated. A further ALU 26 is connected in the recursive flow path whose output forms one input to ALU 20.

It will be understood that if the preceding and succeeding fields are considered to contain future and past instances of a field, respectively (as is true in a dynamic image), then forward transformation corresponds to a path from the future, recursion to a path from the present, and retrograde transformation to a path from the past. The weighed sum of the three paths may be set up as as convolution operation on the temporal neighborhood of a pixel. This may occur at the same time as the convolution operation is being performed on its contemporary spatial neighborhood (i.e., eight spatial neighbors and two temporal neighbors.) Combined usage of the retrograde pathway to implement both feedback loops and temporal convolutions is also envisioned.

Figure 3:
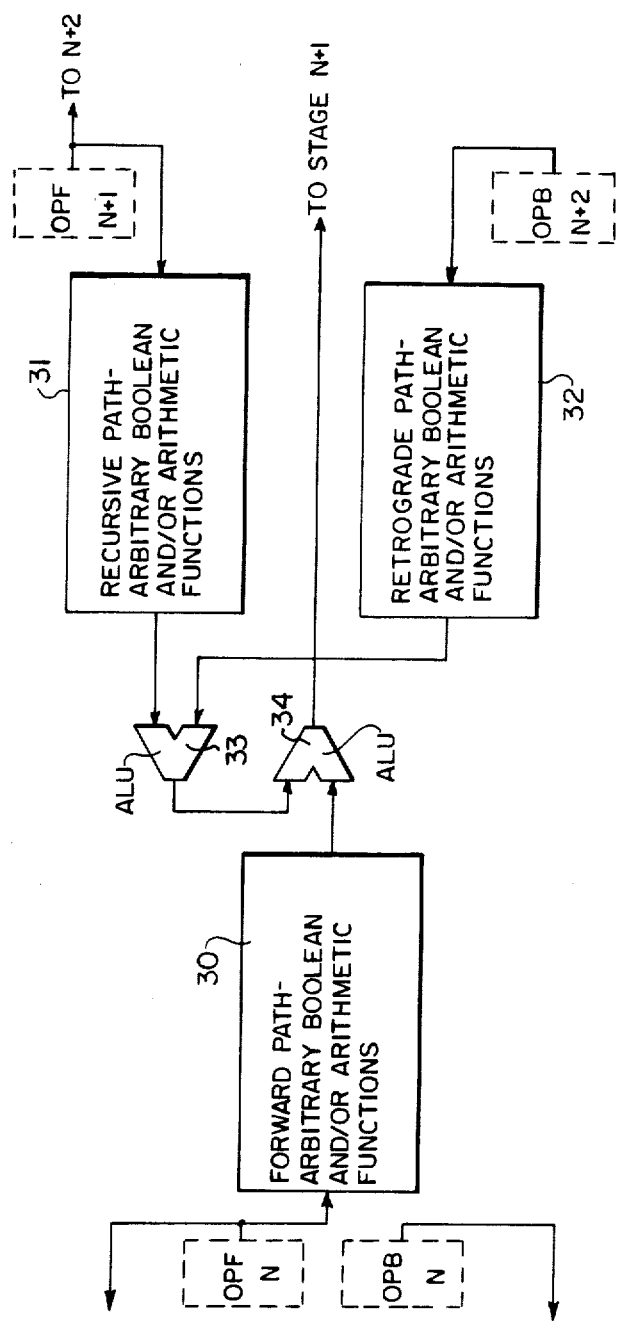
FIG. 3 is a schematic block diagram further illustrating the interconnections of the various paths between one stage and adjacent other stages.

Referring to FIG. 3, some aspects of the inter-stage combining logic are shown schematically to clarify the interactions between the pathways in the temporal domain. In FIG. 3, the forward path is indicated at 30, the recursive path at 31 and the retrograde path at 32, with the combining logic indicated by ALUs 33 and 34. The outputs of the forward neighborhood operators (OPF) and the backward or retrograde operations (OPB) are shown for stages N, N+1, and N+2, as linked by the combining logic. At every stage, data from any of these pathways may be subjected to a comparison operation (e.g. thresholding) to transform arithmetic data to boolean data. Tne arbitrary boolean and/or arithmetic functions indicated in FIG. 3 represent a versatile set of possible operations (including the arithmetic to boolean conversion) that may be applied to each data stream prior to combination by table look-up.

It is helpful in understanding the functions of these processing pathways to consider each in isolation first. If only the forward transformation path is operative (i.e., the weights for the retrograde and recursion operators are set to zero), the image processor of this invention is reduced to a simple image pipeline processor which can sequentialy apply a variety of neighborhood operators to the series of images flowing therethrough. Such a processor can perform either arithmetic or boolean neighborhood operations and, by thresholding, convert an arithmetic image into a boolean image. For example, such a processor might be used to smooth an arithmetic gray scale image, apply edge detection operators to that image, threshold the "edginess" value to form a binary edge image and then apply boolean neighborhood operations to find features in the edges. The operation types and parametric values for these operations would be set indivdually for each stage by the stage control units, which in turn would be instructed (for example from the host) by means of the input marked "stage-by-stage processing control" in FIG. 1.

A second single-path case results if the combining functions (weights) of both the forward and retrograde paths are zero. Assuming that images had previously been loaded into the processing stages, the recursion path would then cause the image field in each stage to pass through the forward or backward transformation operation recursively, while the images "marched in place". A variety of relaxation operations can be implemented in this way.

Boolean information can be processed in an interesting way by combining the outputs of the forward operator from the previous stage and the recursive input from the current stage. Considering the case of a single stage treated in this fashion for eight field-times, using "SHIFT then OR" as the combining operation, if the incoming images from the previous stage have boolean values resulting from successive independent operations and comparisons, such a stage will accumulate images from the eight preceding boolean operations into an image composed of eight-bit boolean vectors. Subsequent boolean neighborhood operations may apply independent operators to each bit plane of a neighborhood of such vectors.

For the final single path case, consideration will be given to what happens when the weights assigned to the forward and recursive paths are zero, leaving only the retrograde pathway active. This path was referred to above in the context of local feedback and temporal convolution operations. However, when the set of such paths is considered in isolation, it becomes clear that the set forms a processing chain that is a retrograde counterpart of the forward pipeline. It would, in fact, be possible to select appropriate retrograde transformations, insert fields of data at the back of the device, process them through to the front, and get the same result as running the system in the normal direction. The purpose of this is not to provide a bidirectional image processor, but rather to permit input 9 at the "output" end of the device, synthesized images. Such images influence the processing of the normally flowing images by direct interaction, and correspond to "expectancies", "models", "hypotheses", or "attention functions".

Figure 4:
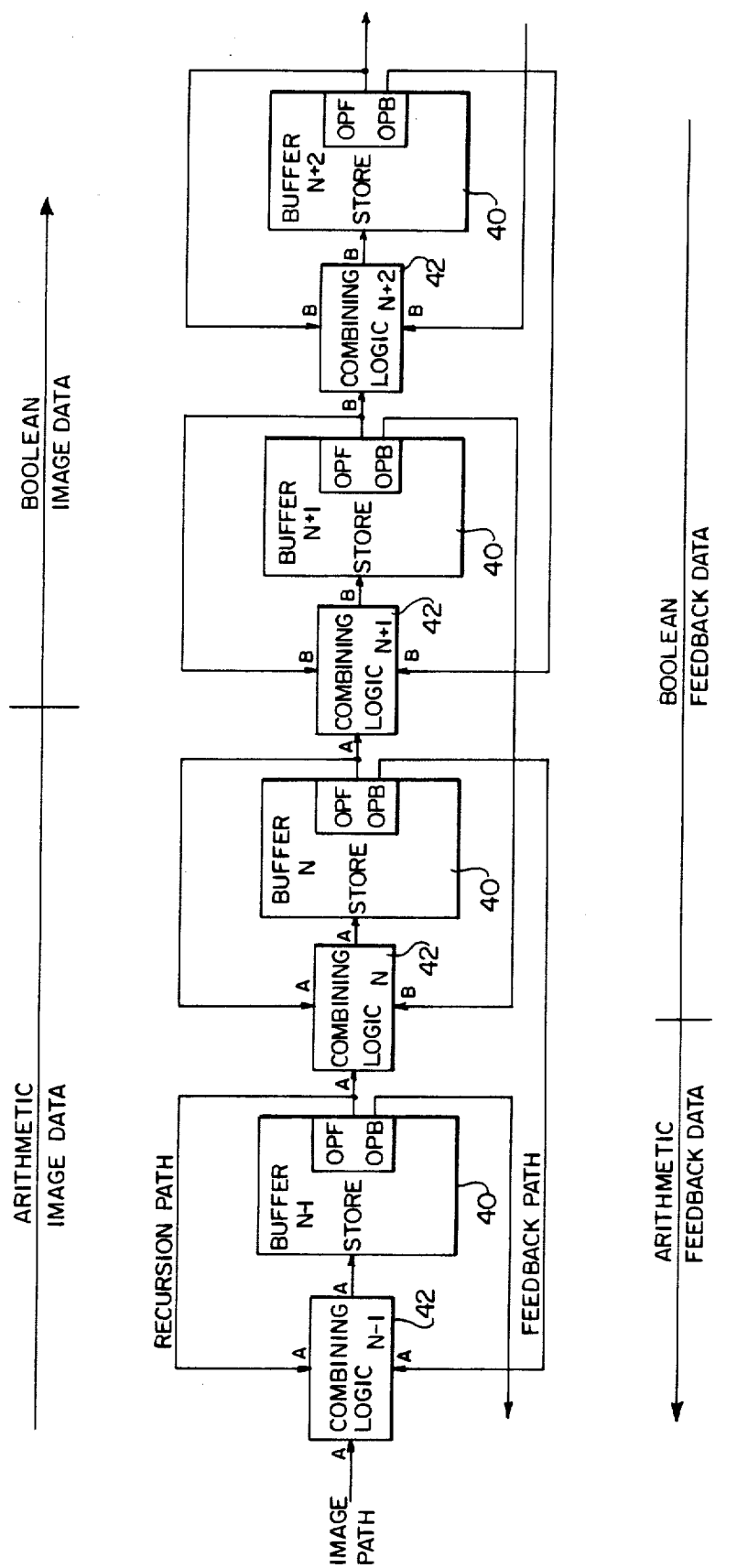
FIG. 4 is a simplified block diagram of the buffers and combining logic for a plurality of stages.

The retrograde images are not only able to affect processing of the forward imges, but are affected themselves by interaction with these images. It might be noted here that the effects the two image sequences exert on each other may be different because the neighborhood operators on the forward and backward paths are independent. Retrograde images will usually be generated by knowledge-based processes in higher level components of the system. They may initially appear in boolean form, but, as shown in FIG. 4, provision is made for all four possible combinations of arithmetic and boolean inputs and outputs in the combining logic between stages. In FIG. 4, the buffers 40 and combining logic units 42 are illustrated for four stages, viz., N−1, N, N+1 and N+2 and the four combinations AAAA, AAAB, ABBB and BBBB are shown. This permits a descending boolean image to be instantiated into arithmetic image values by interaction with the ascending arithmetic image. This occurs in the same stage in which the ascending arithmetic image representation is thresholded to become a boolean image. Both the ascending data image and the descending "hypothesis" image can pass across this interface. A major function of the image processor of this invention is to explore the effectiveness of various approaches to hypothesis-guided iconic image processing.

Figure 5:
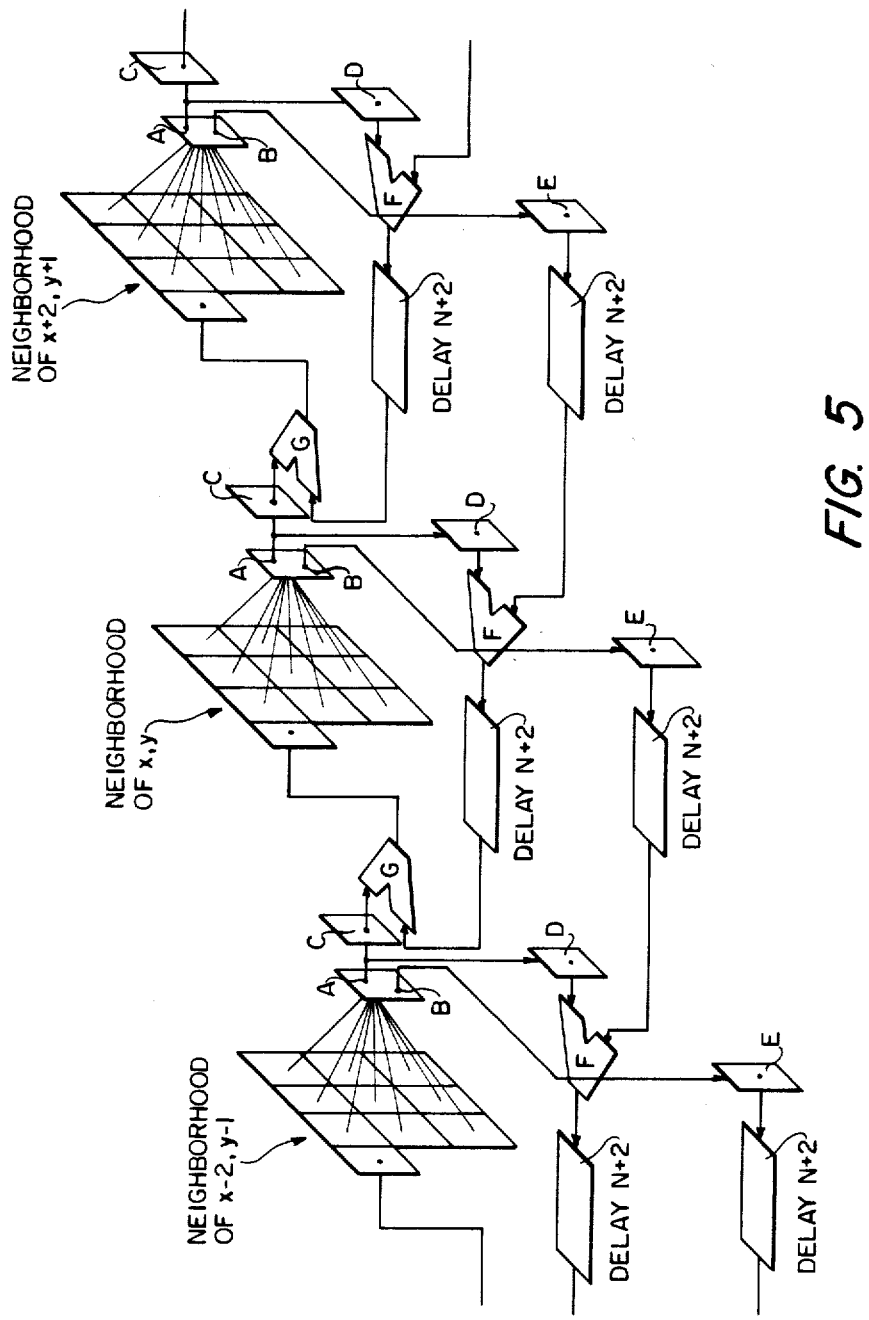
FIG. 5 is schematic diagram illustrating the neighborhood operators, path functions and combining logic for a plurality of neighborhood operations.

It will be understood that the image processor of this invention is not a simple parallel image pipeline. Each stage in the pipeline of images contains its own, internal, pipeline which is used to perform the neighborhood operations. In other words, the operations are not applied to every pixel neighborhood of each stage simultaneously, but are performed sequentially, raster scan fashion, over the stage within one field time. Of course, the stages all operate in parallel, so that the whole pipeline of images is processed in a single field time. The sequential nature of the within-stage processing, together with the existence of the recursive data path, could pose problems in performing the neighborhood computations. If each neighborhood operation were to be computed using values taken directly from the image, then those points above and to the left of the central pixel in the neighborhood would already have been processed, and perhaps altered, by previous pieplined operations. To avoid such problems, the pixel neighborhoods being processed in each field are read/write shifted so that the incoming pixels from the pipeline, which are continuously updating a field belonging to a later image epoch, do not appear in the neighborhoods of pixels being processed in the current image epoch. Between-field read/write address differences simulate time delays to compensate for this staggering and thus insure that homologous pixels from each field are received by the combining logic. The manner in which this is supported for the interactions of the various pathways is shown in FIG. 5, where the required parameters of the simulated delays are illustrated. In FIG. 5, the neighborhoods of $x-2$, $y-1$; x, y; and $x+2$, $y+1$ are illustrated and the operators, functions and combining logic are represented as follows: A is the forward neighborhood operation; B is the retrograde neighborhood operation; C is the forward path function; D the recursion path functions; E the feedback path function; F the recursion/feedback combining logic; and G the image/-recursion/feedback combining logic.

The present system has a variety of features and operating modes in addition to the neighborhood operations discussed above. The input stage (unit 11 in FIG. 1) is provided with the ability to fill one field buffer with the difference between the contents of either buffer and the incoming image. In this fashion, the input stage can force the image processor of this invention to process only those portions of the image which change from field to field. Anotner option allows the image processor of this invention to accept definitions of "regions of interest" in an image, and to cause each stage to apply a complete alternative operation set within its own region of interest. Regions of interest can be specified by means of a bit map resident in the alternate buffer of a stage as discussed below. A further mode of operation allows multi-resolution image-processing. For example, the image processor of this invention can use its forward image-processing path to reduce an image into successive half-resolution representations, and its retrograde path to construct successive double resolution representations, thus implementing a form of multi-resolution pyramid. Processing within any level of such a pyramid can be accomplished through use of the recursive pathway, while interactions between levels of the pyramid are accomplished through the forward and retrograde image paths. In interlevel interactions, the mapping of pixels into higher or lower resolution images occurs automatically. Multi-resolution image-processing using the image processor of this invention is discussed further below. Another useful feature of the image processor of this invention is the provision of two "wildcard" busses, which allow images to be transferred from a stage to any or all other stages in a single field time. These busses allow quick access to, and dissemination of, intermediate results. They also make it possible to connect the stages into a ring-like structure, or to bring synthetic images from the host to any stage.

Turning now to a more detailed consideration of the three basic stages in the image processor of this invention, as set forth above, the input stage (indicated at 11 in FIG. 1) is used to capture images from input devices. The input stage allows the image processor of this invention to accept digital or analog signals from any device using standard RS-170 television signals and timing. Analog signals are digitized by an eight-bit real time digitizer (not shown) included in the input stage.

The input stage is capable of acquiring a digitized image of 256×240 pixels while remaining synchronized with RS-170 signals. Alternatively, the input stage can capture 256×256 pixel images from non-RS-170 signals while internally employing non-standard pixel rates. The input stage can continually capture such images at standard television field rates, and place them in either of the two field buffers (not shown) contained in the input stage. While storing an image into one of these buffers, the input stage can also simultaneously store an image, such as a difference image, formed by an ALU operation between the incoming image and a previously captured image, into either buffer. The contents of either of the buffers in the input stage can be sent to the first of the processing stages, while the next image is being acquired.

As will be evident from the foregoing, the heart of the present system is formed by the intermediate processing stages. The first processing stage is one of a series of modular intermediate processing stages (MIPS). The MIPS are the "stages" described in the preceding sections, and are the elements which perform most of the processing. All MIPS are of identical modular construction, and are physically interchangeable simply by switching card edge plugs and circuit boards. Thus, any MIPS can operate at any position in the processing chain, and the processing chain can have a variable length. In an exemplary embodiment, eight MIPS are used.

Figure 6:
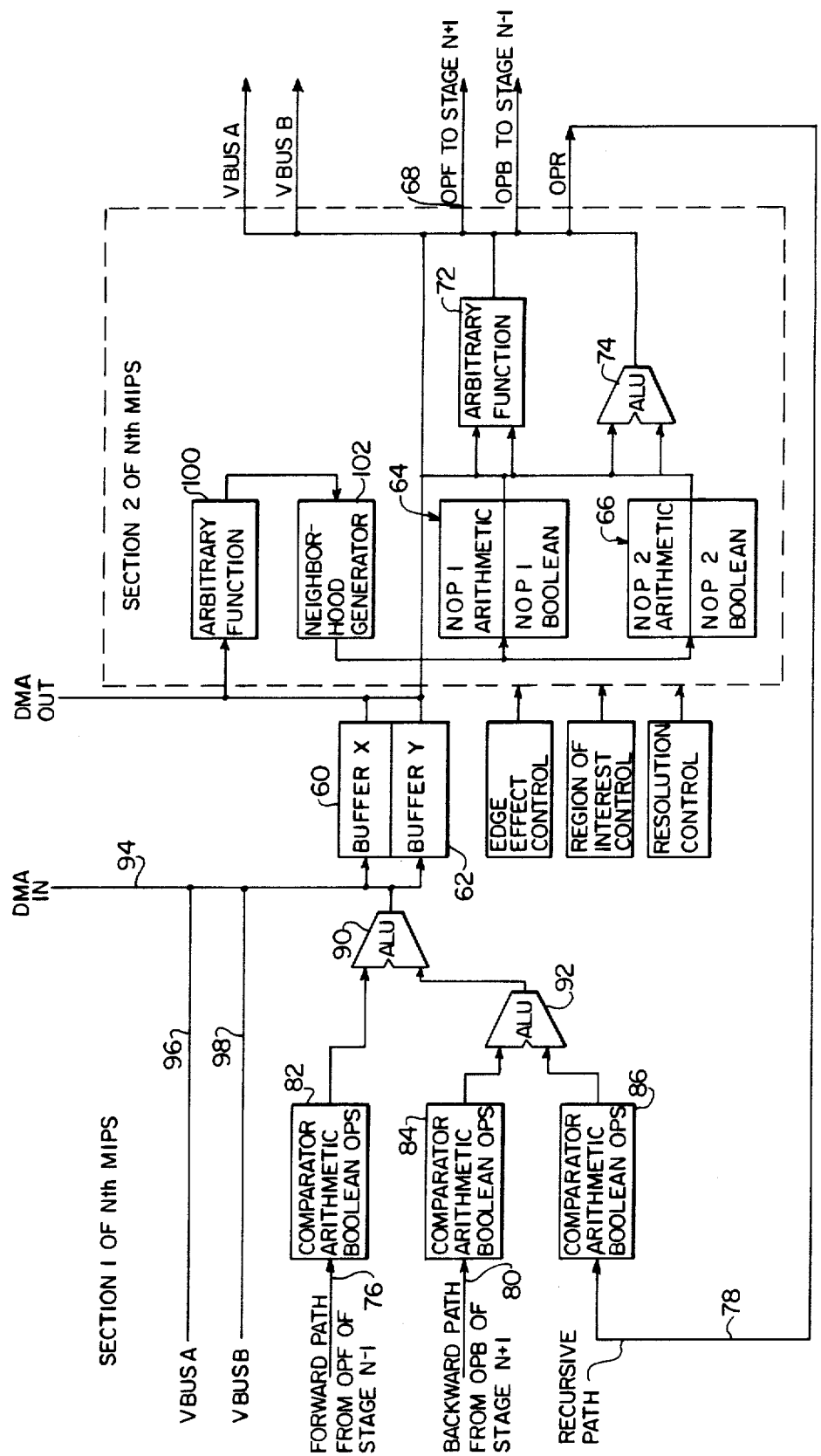
FIG. 6 is a block diagram of the basic components of one of the intermediate image processing stages.

In general, each MIPS accepts an image from the preceding stage, performs various operations on the image, including combining the image with recursive and retrograde feedback images from other stages, and stores the result in either or both of two field buffers within the MIPS. The internal organization of MIPS is shown in FIG. 6 and the buffers are indicated at 60 and 62. The MIPS can then simultaneously apply any two neighborhood operators 64 and 66 (also denoted NOP1 and NOP2) to the image in one of its two buffers. As indicated, the outputs of the neighborhood operators NOP1 or NOP2 are selectably used as the sources of the forward (OPF), or backward (OPB) operations, or both. The results of applying the outputs OPF and OPB are delivered as two new images to the pathways denoted 68 and 70, leading from the first stage the next stage, i.e., stage N+1 for the output OPF and the previous stage N−1 for the output OPB.

Both operators are applied to every pixel in the image within one RS-170 field time (1/60 sec.), so that a continuous pipelined flow of images is maintained at standard television field rates throughout the chain of MIPS. Inter-stage read/write address differences implemented within the MIPS insure that operations that combine pixels from forward, recursive, and retrograde pathways will operate on homologous pixels in each image.

The MIPS also makes available the functions of two arguments. One function, indicated 72, is a table lookup that uses corresponding pixels from both of the buffers 60, 62 in a stage to produce an output. Twelve bits are used to generate the lookup table address. They may be chosen from the sixteen available bits (eight from each buffer 60 and 62) in a variety of ways. For example, six bits from each buffer can be used, or eight from one and four from the other, or any other combination chosen by the programmer. The other function is a full-function ALU, denoted 74, which takes eight-bit inputs from both sources.

The Nth MIPS shown in FIG. 7 accepts three eight-bit 256×256 pixel images as input. These come from the forward output of the N−1st MIPS (on line or path 76) from the recursive output of the operation performed on the previous contents of the Nth MIPS (on line 78), and from the retrograde output of the N+1st MIPS (on line 80). Each data stream may consist, independently of the other two, of arithmetic or boolean (eight-bit boolean vector) data, but a given data stream entering a MIPS must be entirely boolean or arithmetic within any single image field.

Before generating a final eight bit image from the three data streams, each MIPS performs comparison, boolean, and/or arithmetic operations on each of them independently and simultaneously, according to the type of data present. To this end, three comparators, denoted 82, 84 and 86, for boolean and/or arithmetic operations, are provided. If an input stream contains arithmetic data, either comparison or arithmetic operations are possible by table lookup. A (conversion) operation may thus be a multiple window comparison, which converts an arithmetic pixel to a boolean vector, with the bits of the boolean vector independently specifiable. The arithmetic operation can consist of any function of a single argument. If an input stream contains boolean data, the boolean operation can perform functions such as a 0–7 place barrel shift, and apply AND (NAND), OR (NOR), and EXOR operations to the result.

The resulting three boolean and/or arithmetic data streams produced at the outputs of comparators 82, 84 and 86 are the combined through means of two independently programmable full-function ALUs 90 and 92 into a single arithmetic or boolean data stream. This data stream (or when enabled, a DMA data stream provided by an external device over input line or bus 94) is then used to load either of the two selectable field buffers 60 and 62 within the MIPS. Alternatively, either or both buffers 60, 62 can be filled using the wildcard busses or lines denoted 96 and 98. The contents of both of these field buffers 60 and 62 are then available to subsequent operations of the MIPS. External device access to the buffers 60 and 62 is also available; an external device (not shown) may read from or write into either buffer in a random access manner at 400,000 pixels/sec., with auto-indexed addressing supported on command. The wildcard busses 96 and 98 provide streaming access to external devices (including monitors) at pixel rates.

The hardware that implements those MIPS functions subsequent to the field buffer storage step is physically contained on a separate circuit card to allow it to be replaced with other special functional modules, should this be desirable. This circuitry is represented by the dashed line area labeled "Section 2" in FIG. 7. In operation, an eight-bit image is first selected by reading the contents of one of the two field buffers 60 and 62 in the MIPS. The image is transformed by an arbitrary, programmable, single-valued mapping function, denoted 100, and the pixels of the resulting image are subjected neighborhood operators, of which there are two kinds. The first type of neighborhood operator provides an arithmetic convolution operation, while the second provides a boolean operation. For either operator, the neighborhood of operation is, in the embodiment under consideration, 3×3 pixels square, and the operation is accomplished in 200 nsec. Pixel neighborhoods are generated by passing the data stream through a 3-line buffer. These operations are represented by neighborhood generator 102 and the neighborhood operators 64 and 66 mentioned above.

In the arithmetic case, the convolution operation uses arbitrary positive or negative eight-bit neighborhood weights, and maintains twelve-bit accuracy in its intermediate results. The final eight-bit arithmetic result is produced by non-biased rounding, from a 20-bit sum. In the boolean case, the neighborhood operation consists of arbitrary boolean operations (a sum-of-products AND-OR array equivalent) between the set of all the pixels of the data neighborhood, and the set of all corresponding pixels of an arbitrarily specified comparison neighborhood. Any bit of either neighborhood may be independently defined as true, false (complemented), or "don't care". Each of the eight bit-planes forms an independent set of inputs, subject to independent neighborhood operations. As a result, eight independent one-bit results are obtained from a single pass of the data through the pipeline, yielding an orthogonal eight-bit boolean vector as output.

The two neighborhood operators 64 and 66 (NOP1 and NOP2) are applied independently and simultaneously. They operate on the same data stream, using neighborhood operations which may be different. Their outputs may be independently subjected to a second transformation by either of the two programmable functions 72 and 74 referred to above. As discussed above, the first of these, denoted 74, is a lookup-table mapping function. This transformation may be a function of two arguments. If two arguments are used, one is taken from the homologous pixel of the field buffer (60 or 62) which is not the source of the image being subjected to the neighborhood operators. As also was discussed, the number of bits used from the two arguments must total twelve. For example, the six most significant bits of each argument. If only one argument is used, all eight bits are available, the remaining bits being interpreted as "don't care". As mentioned previously, the other function is the ALU72, which has two eight-bit inputs operating on the same sources. The data stream arising from either of these operations applied to one of the operators NOP1 or NOP2 (a result denoted by OP1 and OP2, respectively) is selected to become the OPF output of the MIPS, and the data stream arising from the operation applied to either the same or the other of the operators NOP1 and NOP2 becomes the OPB output of the MIPS.

A "region of interest" operator or control, denoted 104, allows each MIPS to switch between the normal (OPF, OPB) operation set and an alternative (OPF', OPB') operation set on a pixel-by-pixel basis. The criterion for selecting the operation set is membership of the current pixel's field address in a region of interest set. This set is either supplied by an external controlling process or obtained from a bit plane of the other image buffer in the stage. It can be changed on a field-by-field basis. Other controls provided include an edge effect control 106 and a resolution control 108.

The processor of the invention allows the construction of multiresolution, "pyramid", sequences of images. Pyramids have been found useful in a large number of image-processing applications. Such pyramids have an added utility in a strictly local processor like that of the invention because they allow information from spatially distant regions to be made local.

The basic operations available in the processors of the invention for constructing image pyramids are sampling and pixel doubling. Sampling is used to reduce the resolution of an image, while doubling is used to increase the size of an image. An example is presented hereinbelow to illustrate the utility of these operations in conjunction with the other operations in the image processor of this invention.

Both the sampling and doubling operations are performed by manipulating address lines within a stage. The places in the stage at which the operations are performed are different because of timing considerations. Sampling is achieved by incrementing the source image addresses twice as fast as the destination addresses. That is, on each row, the first pixel in the source image is written to the first pixel in the destination image. The second source pixel is also written to the first destination pixel, overwriting the previous value. The address of the destination pixel is then incremented, and the procedure is repeated. The same process is used to overwrite every other row in the destination image. The result is that the destination image is one quarter the size of the source image, and occupies the upper left quadrant of the image buffer. Each pixel in the destination image is written out four times, to result in the reduced-size image. This is not wasteful because the source image is being read at field rates and the new image is created in a single field time.

Doubling is accomplished by the inverse of the sampling process. That is, the addresses in the source image are now incremented at half the rate of those in the destination image. For each row in the source (reduced-resolution) image, two identical rows are output in the enlarged image. For each pixel in each row of the input image, two identical pixels are stored in the output image. This results in an enlarged image that has four times as many pixels as the input image.

The simple operations of image sampling and pixel doubling are of themselves not very useful except for a narrow range of applications. Combined with the other operations provided in the image processor of this invention, however, a much broader class of operations becomes possible. The sampling process occurs as the image enters a stage buffer. This means that a number of operations can be performed on the source image prior to constructing the reduced-resolution version. Of these, perhaps the most useful is the neighborhood operator, which can be used, for example, to smooth the image before sampling. By iterating the neighborhood operation prior to sampling, the effects of neighborhoods larger than three by three can be obtained, allowing, for example, the construction of "Gaussian" pyramids using the hierarchical discrete correlation procedure disclosed in P.J. Burt, "Fast Hierarchical Correlations with Gaussian-like Kernels", Proc. Fifth International Joint Conference on Pattern Recognition, Miami, Fla., 1980.

In the inverse situation, when the image is magnified, the doubling occurs as the image leaves a stage buffer. Once again, operations can be performed on the doubled image before it is stored into another stage buffer. In this situation, however, the three by three neighborhood is not as valuable as in the sampling case. This is because the "field of view" of the operator does not encompass all the neighbors of a pixel (the pixels have been enlarged to two-by-two blocks). To include all the neighbors, at least two iterations of a neighborhood operation must be applied to the image. This means that expanding a pyramid may take twice as long as compressing it. It will be appreciated that by replacing the three by three operator with a larger one, this asymmetry can be overcome.

An important problem in dealing with images of varying sizes is how to overcome edge effects that arise when the neighborhood operator is applied. This issue is dealt with in the same manner for all sizes of images. It is the responsibility of the programmer to ensure that each stage knows the size of the images in each of its buffers. In principle, it would be possible to make all border pixels belong to a region of interest. Special neighborhood operators could then be applied there to overcome the edge effects. The image processor of this invention provides, as a default solution, the replication of border pixels. If a neighborhood has a row or a column that lies outside the boundaries of the image (either beyond the image buffer itself or beyond the extent of a low-resolution image), the non-existent pixels are replaced by the pixels in the border row or column. For a three by three neighborhood, this is equivalent both to reflecting the image and to repeating the border pixels. This is achieved in the same way as the varying resolution images are constructed, i.e., by manipulating the address lines of the buffer.

The final stage in the image processor of this invention is the output stage which fulfills a role at the end of tne processing chain similar to that of the input stage at the beginning of the image processor of this invention. The final MIPS in the processing chain delivers its forward image output (OPF) to either one of a pair of field buffers in the output stage, and can simultaneously read from the other buffer of the output stage. The data read from the output stage is used as the input to the retrograde (feedback) path of the final MIPS. Without interrupting the image-processing, either buffer of the output stage can be read from or written into by an external device, which is both the consumer of the processed forward data-flow and the supplier of data for the retrograde path.

Turning now to a generalized consideration of the operation of the processor of the invention, using the image processor of this invention involves several steps. First, the hardware of the pipeline has to be set up for the task of interest. As described previously, a pipeline consists of a special input stage for capturing images, a variable number of stages for processing the images, and an output stage for delivering the processed data to a controlling device. Setting up the pipeline involves adding or removing standard cards. Except for the input and output stages, these cards are all interchangeable.

Once the pipeline has been set up, the individual operations to be carried out must be chosen, and the host device must be programmed to load each stage with appropriate instructions for processing successive fields. Each stage has a stage controller that is loaded by the host device. Interfaces between the control units and host devices are 16-bit input and output portions. Each stage-control unit can completely reconfigure the operations and operating parameters of its associated stage on the basis of current or stored instructions from the host device. Changes are made in the interval between image fields. The stage control units can store and select multiple alternative configurations for their stages. The sequencing orders of these configurations are provided by the host device. Programming the image processor of this invention thus consists of specifying, to the control units, the operations and operation sequences to be performed by each stage, and loading the corresponding operators, parameters, and tables into the stages. In operation, the controlling device may instruct the stage control units when to select each stage program, or to sequence a set of programs. For program development, the contents of any buffer and the output of any operator in the system can be displayed on a video monitor, with or without freezing the contents of the buffer, and the whole processor can be single-stepped.

A MIPS unit such as described above in connection with FIG. 7 is also shown schematically in FIG. 8 and examples will now be considered which make use of the schematic MIPS representation of FIG. 8. The unit illustrated has four distinct sections which are connected by switching networks. Briefly considering these sections, at the top of FIG. 8, there is an input section denoted 120 and below this are the two image buffers, denoted 122 (the x image buffer) and 124 (the y image buffer). Next come the neighborhood operations 126, followed by the output processing 128. A final switching network routes the output paths as described hereinafter.

Referring again to FIG. 8, the three boxes 130, 131 and 132 at the top of the figure represent the functions of one argument (lookup tables) to be applied to the forward (box 130), recursive (box 131), and backward (box 132) input pathways in that order, from left to right. In the examples which follow, whatever functional transformation is employed during a given cycle will be shown in the appropriate box as explained below. The single box 134 below boxes 130 to 132 represents the combining function to be applied during the cycle to the results of applying the above three functions 130 to 132. The output functional variable here will be represented as $B_x$, or $B_y$, according to its destination (i.e., whether it is destined for image buffer "X" or image buffer "Y" of the stage). The input variables will be represented as "f", "r", or "b", according to the pathway of origin.

A crosspoint matrix 136 is provided next for switching the inputs between the X and Y image buffers 122 and 124. There are three possible inputs to matrix 136 and two possible outputs. Two of the inputs arise from the wildcard busses (denoted VBUSA and VBUSB), while the third is the output from tne combining function 134. Any of the inputs can be stored in image buffer 122 (X) at the same time that the same or another input is stored in image buffer 124 (Y). As an image is stored into one of the image buffers 122 or 124, it may undergo a sampling operation, reducing its resolution by a factor of two. This will be indicated by the symbol $\wedge$ next to the selected input to the buffer.

Another switch 138 is provided below buffers 122 and 124 that selects which of the buffers will serve as the input to the neighborhood operators 126. Only one image buffer (122 or 124) can be used as the source for the neighborhood operators 126. It is noted that the output from either image buffer can be routed both to the neighborhood operators 126 and to points further down in the stage thereby passing the neighborhood operators. As shown, the terminals in the switching networks in these cases are marked appropriately (1, 2, X or Y), although the lines connecting the terminals to their sources are not shown. Thus, for example, the output of the X image buffer 122 may be used unchanged at all points marked X.

As an image is removed from a buffer 122 or 124, it may undergo a pixel doubling operation, increasing the size of the iage. This will be indicated in the figures discussed below (FIGS. 8 and 9) by the symbol ▽ next to the output from the buffer. It is noted that the output to the neighborhood operator is the same as that bypassing the operator. If one is to be expanded, then both must be expanded.

The buffer selected for neighborhood processing passes first through a lookup table 140 and then through the pair of neighborhood operators 126 which are individually denoted 142 and 144 (and also referred to as NOP1 and NOP2). The outputs from the operators 142 and 144 are marked as 1 and 2, respectively.

Following the neighborhood processing, another switching matrix 146 selects the inputs to the two functions of two arguments indicated by boxes 148 and 150. Any of the outputs from the neighborhood operators 142 and 144 or the image buffers can serve as inputs to the functions. Box 148, on the left, represents an arithmetic operation performed on a pixel-by-pixel basis using an ALU as described previously. Box 150, on the right, represents the twelve-bit lookup table also described above. As discussed previously, the input is twelve bits selected from any two eight-bit inputs in a manner chosen by the programmer. The selection will be marked on the line joining the selected terminals of the switch to the lookup table 150. By choosing eight bits from one argument and setting the remaining four bits to "don't care" values in the table, a function of one input can be implemented.

The final output of the stage illustrated in FIG. 7 is selected from the contents of the X and Y buffers 122 and 124, from the outputs of both neighborhood operators 142 and 144 and from the results of the functions of the two arguments 148 and 150. The outputs can be routed to the two wildcard buffers, indicated by busses or lines 152 and 154 at the right of FIG. 8, and to the backward, recursive, and forward data paths from the stage, indicated, respectively, at 156, 157 and 158 at the bottom of the figure. The only restriction is that two different data streams cannot be routed to the same output path.

Throughout the programming examples considered below, a blank box will repesent an inactive operation while a simple pass-through operation will be denoted by the unity function, U. It will be apreciated that, in practice, many functions shown in these examples as unitary or elementary functions will actually be modified to provide rounding or scaling operations as required for optimal computation accuracy. Since the functions are derived from table lookup, these incidental computations may be inserted automatically from a compiler library, and remain transparent to the user.

Two examples are presented below using the schematization that has just been described. In these examples, illustrated in FIGS. 8 and 9, data flow charts are constructed with stages proceeding from left to right in order of spatial data flow through the machine. In other words, in any given row of the chart, the Nth stage is to the right of the N−1st stage, and to the left of the N+1st stage.

Data flow in time is presented in FIGS. 8 and 9 in the vertical direction. Thus, each row represents a "snapshot" of the stage of the machine during a given cycle. Each component of the row represents a single MIPS. Each column represents tne evolution of successive states of a single MIPS stage over time. It follows that data must always enter a stage from the row above, and exit to the row below. Data which is stationary in space (i.e., which follows the recursive path only) will process vertically down a column. Data moving forward through successive stages will flow through the chart diagonally down and to the right, while data moving backward through successive stages will move diagonally down and to the left. In general, there will be multiple ways of programming a given operation in the image processor of this invention. Some of these may be space-intensive, while others may be time-intensive. It will be understood that tradeoffs may be made between space and time intensive use of resources of the image processor of this invention according to the demands of the task.

Turning now to a specific example, it is noted that the image processor of this invention can be used for any image processing task which can be performed using a $3 \times 3$ neighborhood convolution window. An example of such an algorithm is the Sobel edge operator which calculates an approximation of the gradient $G(r,c)$ and its associated direction $\phi$ $(r,c)$ for each row $(r)$ and column $(c)$ pixel in the image. Formally, $$I_1(r,c) = I(r,c) * C_1$$

$$I_2(r,c) = I(r,c) * C_2$$

$$G(r,c) = \text{sqrt}(I^2 + I^2)$$

$$O(r,c) = \text{atan}(I_2, I_1)$$

where $$C_1 = \begin{matrix} -0 & 0 & 1 \\ -2 & 0 & 2 \\ -1 & 0 & 1 \end{matrix} \quad \text{and} \quad C_2 = \begin{matrix} 1 & 2 & 1 \\ 0 & 0 & 0 \\ -1 & -2 & -1 \end{matrix}$$

and

* denotes the convolution operator.

The Sobel edge operator program is shown in FIG. 8 using the standard stage schematic discussed hereinabove. However, in order to illustrate how new images are inserted into the image processor of this invention, the notation discussed above needs to be modified slightly. The first input image will be labeled Ip and the next input image will be denoted as Iq. All of the intermediate images required for the algorithm will carry an extra subscript indicating the source image. This is important because the second input image can be inserted into the image processor of this invention before the first image has been fully processed.

Referring to FIG. 8, in the first row, the first input image Ip enters the Y image buffer of stage 1. The neighborhood operation $C_1$ is performed for every neighborhood in Ip and the result, Ip$_1$, is passed to stage 2 through the forward pathway where it is stored in the X buffer. Since there is no specification for the Y buffer of stage 1, the input image remains unchanged in that buffer.

The second row calculates the convolution of the original image with the $C_2$ operator. The result of this operation, Ip$_2$, is passed to stage 2 through the forward pathway where it is stored in the Y buffer. It is also sent through the recursive pathway of stage 1 and is stored in the Y buffer. This overwrites Ip but this is no loss because the input image is no longer needed.

In the third row, the angle of the gradient is calculated using the function of two variables lookup table set up for atan($I_2, I_1$) This angle is sent out the forward path. Simultaneously, the $I_{p_1}$ buffer is sent out the recursive pathway.

The fourth row uses the input lookup tables to square the inputs from the forward and recursive inputs. These inputs are then added in the ALU (corresponding to box 148 of FIG. 7) and stored in the Y buffer. After the square root of this quantity is taken in the final lookup table (corresponding to box 150 of FIG. 7), the estimate of the gradient $G_p$ is available. Simultaneously, the next input image $I_q$ overwrites the Y buffer of stage 1 and the pipelined process continues on the next image.

For the first image, four cycles are needed. However, for all subsequent image, only three cycles are required because the first cycle of the current image is processed simultaneously with the fourth cycle of the previous image It is noted that there may be some question concerning the ability of the host computer to accept output images at the rate shown in this example (roughly 200 ns per pixel). For this example, there is no problem because the Sobel operator would probaly be used as a preprocessing step for further processing in the image processor of this invention. If this were not the case, then the result could be sent to the host computer through the DMA channel at a suitably lower rate.

Comparing the processing capabilities of the image processor of this invention with the sequential techniques used in von Neumann computer architectures, to perform the Sobel operator using the latter for an n×m pixel image requires 19 nm additions, 18 nm multiplications, and 3 nm lookups. Assuming that each operation takes the same amount of time and that each image has the RS-170 standard of 256×240 pixels, the total number of operations is 40 nm=2.46 Mops. For the image processor of this invention, the amount of time required (after the inital image) is three field times, i.e. 0.05 seconds. Consequently, a von Neumann type computer must operate at 49.2 Mops/second to keep up with the image processor of this invention.

Turning now to an example of pyramid-based processing using the image processor of this invention, a process will now be described in connection with FIG. 9 for computing and applying local thresholds for compact object detection. The method is a simplified version of the method developed in M. Shneier, "Using Pyramids to Define Local Thresholds for Blob Detection", IEEE Trans. PAMl-53, May 1983, pp. 345-349. The problem is to find occurrences in an image of compact objects whose approximate sizes are known. The procedure uses a pyramid of images to locate and extract such objects. Objects are extracted using a spot detector applied at the level in the pyramid corresponding most closely to the sizes of the objects being sought. Thresholds are computed and projected down the pyramid. They are applied to the original image in the regions corresponding to the locations of the spots.

The process is illustrated here for objects of size about four by four pixels. It is noted that, in practice, this would almost certainly be too small a size for real objects, but the example illustrates all of the steps in the algorithm. For objects of larger area, all that would need to be done would be to continue constructing pyramid levels until the desired pixel size was reached. The method is to construct a pyramid of images $I_0, I_1, \ldots, I_k$. Here k is the level at which single pixels correspond to regions in the original image of about the right sizes (i.e., within the nearest power of two). At level k, a spot detector is applied to the image to locate pixels that contrast strongly with their background. These pixels are assumed to correspond to objects of the right size. A local threshold is computed for extracting each object, and is projected down the pyramid to the bottom level. There it is applied to the original image, resulting in an image containing only objects of the right size.

The pyramid is constructed using a three by three averaging operation A, followed by sampling. Here the neighborhood operation is:

$$A = \begin{matrix} 1 & 1 & 1 \\ 1 & 1 & 1 \\ 1 & 1 & 1 \end{matrix}$$

Following the application of a, each pixel is divided by eight (or left shifted three times) to form the average, before the pyramid sampling takes place. The pyramid sampling is denoted in FIG. 9 by $\triangle$. Two levels of pyramid operations are shown, but the number of levels is a function of the size of the objects to be extracted, and as stated, the pyramiding could be continued as illustrated to produce lower-resolution images.

When the top level of the pyramid is reached, each pixel corresponds to a region of roughly the desired size. At this point a spot detector S is applied to the image. This a three by three Laplacian operator looking for a central peak surrounded by a valley. The value of the central weight can be adjusted to increase the contrast required between the peak and the valley. For example, $$S = \begin{matrix} -1 & -1 & -1 \\ -1 & 7 & -1 \\ -1 & -1 & -1 \end{matrix}$$

The output of this operator is thresholded, giving a set of peak spot values (1's) and a background of non-spot values (0's). The threshold spot image is stored in the alternate buffer of stage k.

By applying the spot detector to a low resolution version of the image, responses to spots smaller than the desired size have been minimized, and a global operation has been made local. The pyramid does not, however, prevent the spot detector from responding to spots larger than the desired size. To ensure that this is accomplished, a second neighborhood operation, F, is applied to the output of the spot detector S. The operation F ensures that a spot has no more than some maximum number, n, of neighbors that are also spots. Spots that are surrounded by other spots are deleted. The operation F is represented as:

$$F = \begin{matrix} -1 & -1 & -1 \\ -1 & n & -1 \\ -1 & -1 & -1 \end{matrix}$$

It will be appeciated that what is happening here is that a spot detector is being applied to the thresholded output of the original spot detector. If desired, the same spot detector can be applied in both cases.

The output of the operator F, denoted $I_s$, is stored in the alternate buffer of the stage. The original (reduced-resolution) image $I_k$ is still in its buffer, unaltered by the processing. The next step is to compute a threshold to be applied to the original, full-resolution, image in the region corresponding to each spot. This is achieved using yet another neighborhood operation. This time, however, the operator is applied only at pixels designated by the region-of-interest operator. The operator, G, is applied to the gray-scale image, using the output of the spot detector as the template for the region of interest. The result of applying G is then divided by sixteen to provide the desired threshold for each region. The operator G is represented as:

$$G = \begin{matrix} 1 & 1 & 1 \\ 1 & 8 & 1 \\ 1 & 1 & 1 \end{matrix}$$

The thresholds are stored (as image I) in the pixels corresponding to the regions to which they are to be applied. The threshold resulting from applying tne above sequence of operations is the average of the gray value at the center of each detected spot and the mean of its eight neighbors. This was found to give good results in the Shneier reference cited above.

Now that local thresholds have been found for each spot, it remains to project the values down the pyramid to cover the corresponding regions, and to apply the thresholds to the original image. Projecting the thresholds down the pyramid simply involves duplicating each pixel of the low resolution image into a two by two block of identical pixels at the next higher resolution. This is a function provided by the image processor of this invention. It is denoted in FIG. 9 by the symbol $\nabla$.

The final step of thresholding is done by comparing the original image with the image of thresholds on a pixel-by-pixel basis. This operation uses tne logic for combining inputs to tne stage, and results in an image I that has 1's for points within regions of the desired size, and 0's elsewhere.

The capabilities of the present system can be enhanced or extended in a number of ways, by adding pre-processors and post-processors. A processor (not shown) can be inserted before the input stage to perform conformal mappings. This will allow rotations in the image plane and range changes (image scaling to be converted to image translations. The image differencing and motion-detection abilities of the image processor of this invention will then simplify analysis of the changes.

At the output end of the present system, another processor (not shown) can be provided for converting image data to symbolic data (using, e.g., an iconic to symbolic mapper, or ISMAP). This processor can, for example, collect information about the locations of all features of a particular kind and present the information to the host as a unit. This processor can also be used to histogam images and reduce the amount of data to be handled by the host processor to more manageable levels.

The neighborhood operators in the present system all preferably reside on separate boards. This arrangement facilitates changes to the stages when faster neighborhood operators become available that can handle neighborhoods larger than three by three pixels. A VLSI chip might also be used to perform the operations of an individual MIPS. Since most of these operations are useful for general-purpose preprocessing of images, such chips should provide the ability to construct pipelines using off-the-shelf components. This should simplify the construction of special-purpose real-time image processors.

Although the present invention has been described with respect to exemplary embodiments thereof, it will be understood by those of ordinary skill in the art that other variations and modifications can be effected within the scope of spirit of the invention.

1. An image pre-processor for low-level iconic-to-iconic image processing system, said processor comprising:
 a plurality of sequentially arranged, multiply interconnected processor stages each including means for storing multiple complete images;
 means providing a forward path connection between adjacent stages of said plurality of stages in sequence for transmitting complete processed images between those stages;
 means providing backward path connections between adjacent stages of said plurality of stages in a reverse sequence to the forward path connections between the plurality of the stages for transmitting complete processed images between those stages; and
 means providing a within stage recursive path connection for each stage of said plurality of stages wherein the output of the stage is connected back to an input to the stage for transmitting complete processed images between said output and said input of that stage.

2. An image processing system as claimed in claim 1 wherein each processor stage includes a pair of field buffers for holding a processed version of the image from a single field of data.

3. An image processing system as claimed in claim 2 wherein each processor stage includes means for enabling the carrying out of pointwise arithmetic and boolean operations, and neighborhood operations.

4. An image processing system as claimed in claim 1 further comprising at least one "wildcard" connection between the processor stages for enabling image frames to be moved between arbitrarily selected processor stages.

5. An image processing system as claimed in claim 4 wherein two of said "wildcard" connections are provided for each processor stage.

6. An image processing system as claimed in claim 1 wherein said processor stages each comprise identical modular image processing stages, and at least a portion of each modular stage is mounted on an interchangable circuit board.

7. An image processing system as claimed in claim 1 wherein each of said processor stages includes first and second parallel connected means for performing neighborhood operations, and said neighborhood operation performing means are selectively used as the source of forward path operations, backward path operations or forward and backward path operations for the associated processor stage.

8. An image processing system as claimed in claim 1 wherein each processor stage comprises means for performing neighborhood operations including arithmetic convolution operations.

9. An image processing system as claimed in claim 1 wherein each processor stage comprises means for performing neighborhood operations including a set of arbitrary boolean operations.

10. An image processing system as claimed in claim 1 wherein each of said processor stages includes means for performing region-of-interest operations.

11. An image processing system as claimed in claim 1 wherein each of said processor stages comprises a pair of buffers and further includes means for performing a table lookup function for producing an output from corresponding pixels from both of said buffers.

12. An image processing system as claimed in claim 1 wherein said each of said processor stages further includes a full-function arithmetic logic unit.

13. An image processor system as claimed in claim 1 wherein each processor stage provides transformation functions for application to each of the forward, backward and recursive path connections, and a combining function for application to the results of the transformation functions to provide a first input for that processor stage, each of said processor stages being connected to at least two "widcard" busses which enable images to be moved between arbitrarily selected stages, and which form second and third inputs to that processor stage, and each said processor stage further comprising a pair of image buffers adapted to be connected to said inputs; means for enabling switching said first, second and third inputs between said image buffers, a pair of parallel connected means for performing neighborhood operations and adapted to be connected to the outputs of said buffers; and means for enabling selective switching of the outputs of said buffers to said means for performing neighborhood operations, said processor stages further means for providing an arithmetic operator function and a look-up function, and further comprising switching means for enabling selection of the outputs of the means for performing neighborhood operations and the outputs of said image buffers as inputs for said function performing means, and further switching means for enabling selection, as the output of that stage, between the contents of the pair of image buffers, the outputs from the means for performing neighborhood operations, and the outputs of the means for performing arithmetic operator and table lookup functions for selective routing thereof to a pair of "widcard" output busses and forward, backward and recursive path connection outputs.

14. An image processor as claimed in claim 1 said processor stages further comprise means for performing a plurality of different image processing operations which are selected based on data stored by the image storing means associated with that stage.

15. An image processor as claimed in claim 1 wherein at least one of said path connection providing means each includes means for transforming the resolution level of the image transmitted over that path connection.

* * * * *